Feb. 23, 1943.                  C. A. GRASSWICK                        2,311,826
                          DRAFT AND POWER CONTROL APPLIANCE
                              Filed Dec. 4, 1940            3 Sheets-Sheet 1
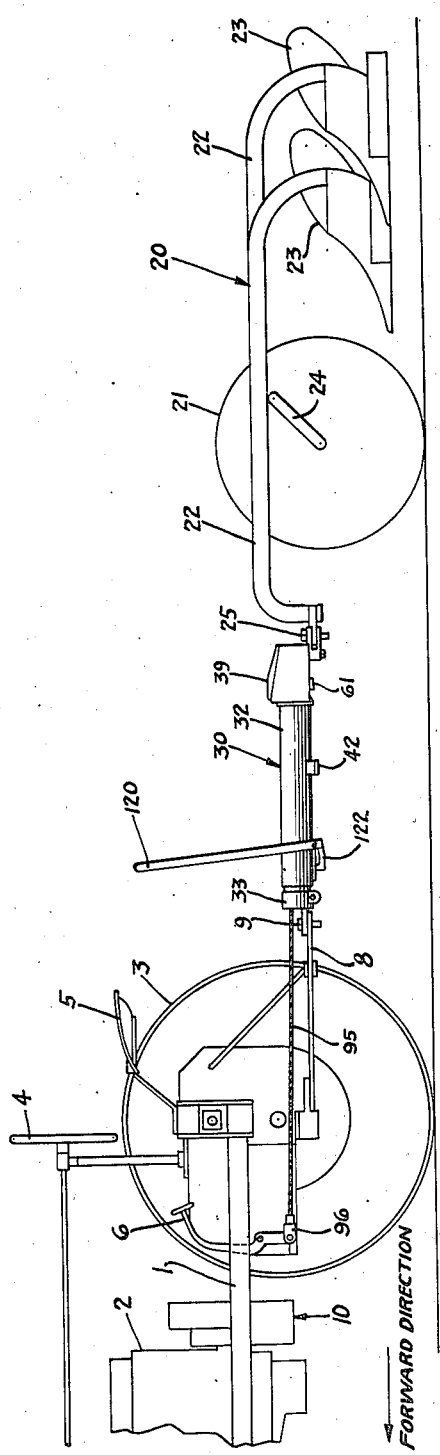
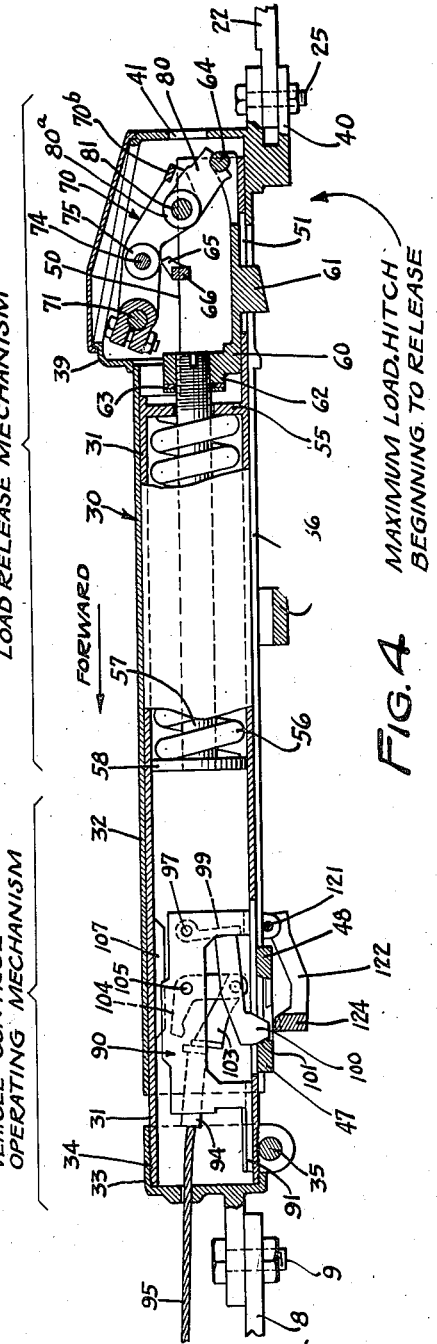
INVENTOR
CARL A. GRASSWICK
By Paul, Paul & Moore.
ATTORNEYS

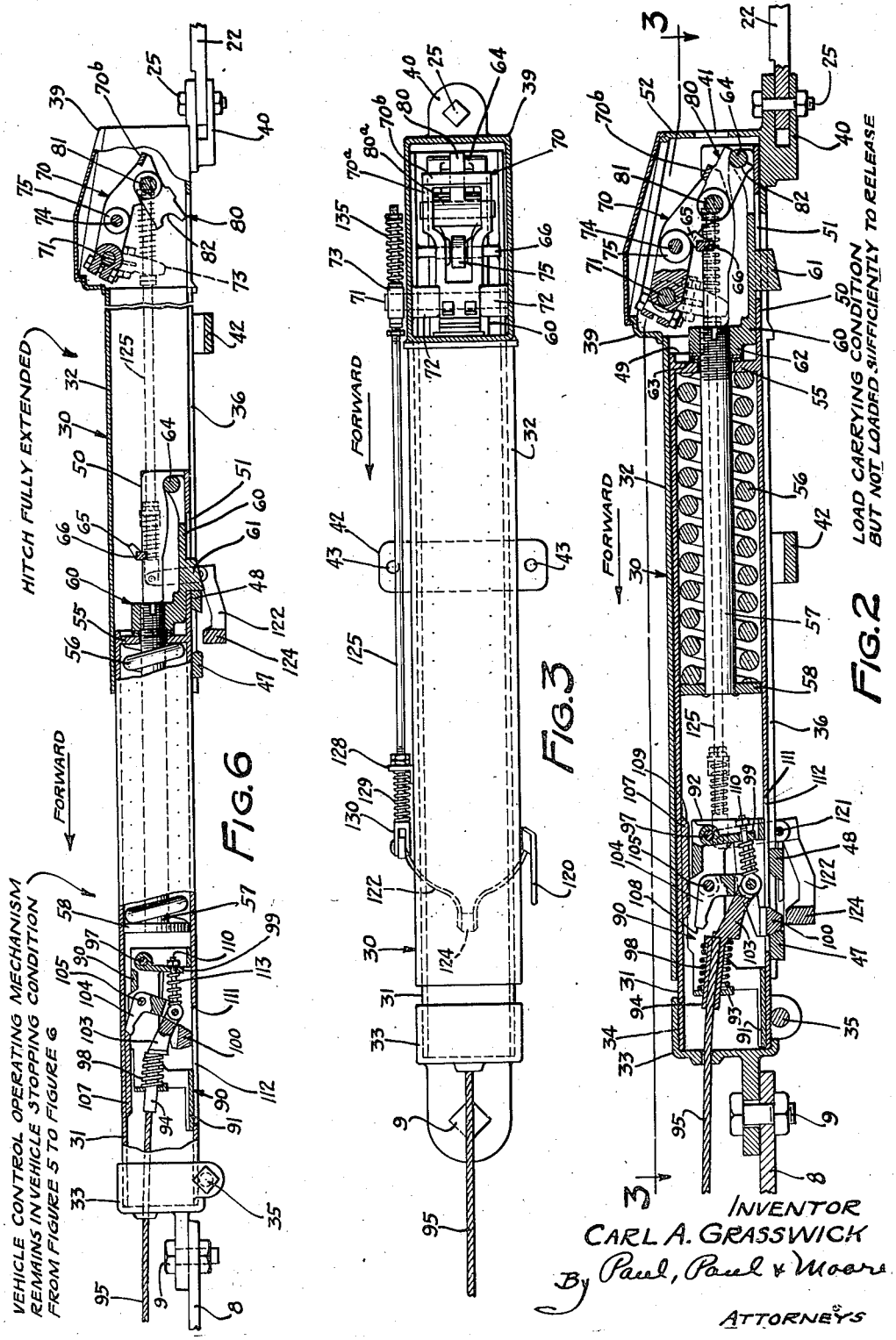

Feb. 23, 1943.  C. A. GRASSWICK  2,311,826
DRAFT AND POWER CONTROL APPLIANCE
Filed Dec. 4, 1940  3 Sheets-Sheet 3
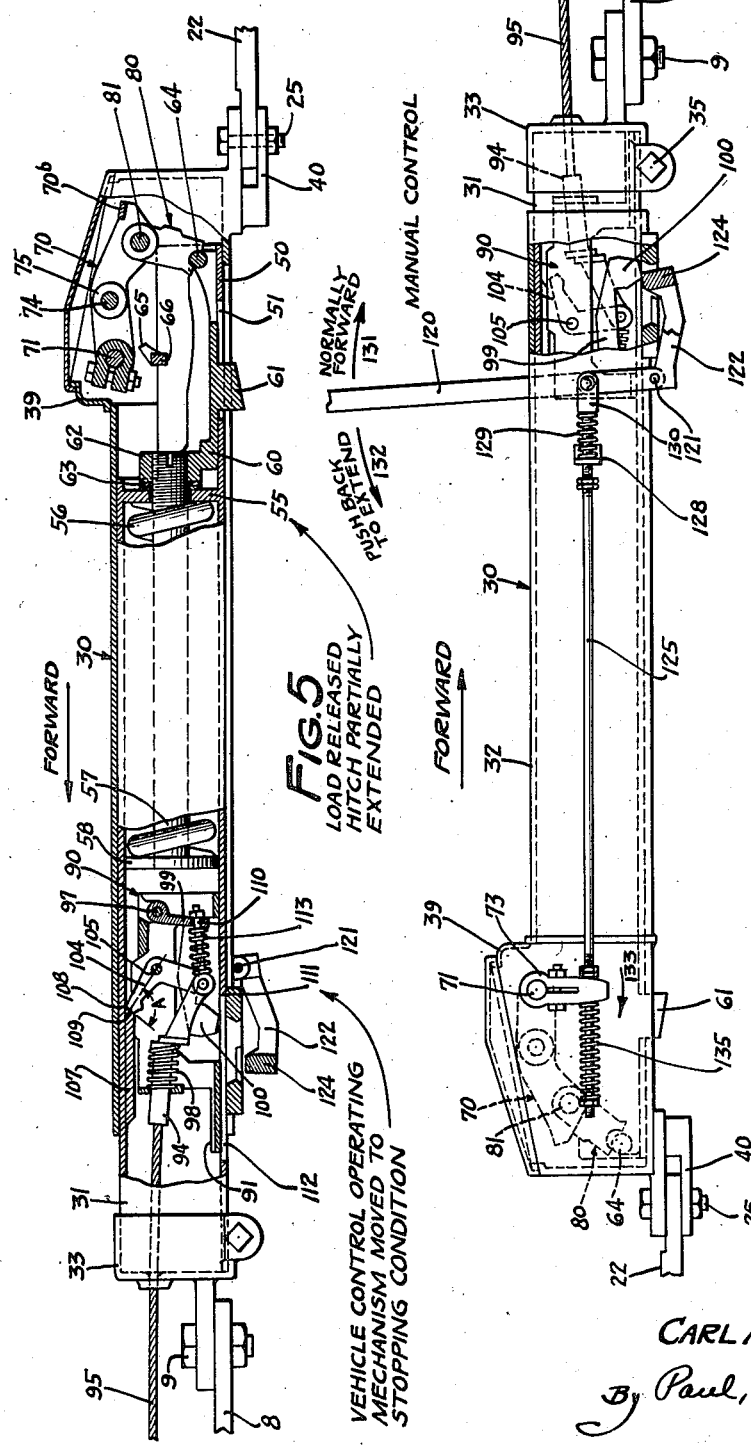
INVENTOR
CARL A. GRASSWICK
By Paul, Paul + Moore
ATTORNEYS Patented Feb. 23, 1943

2,311,826

UNITED STATES PATENT OFFICE 2,311,826

DRAFT AND POWER CONTROL APPLIANCE

Carl A. Grasswick, St. Charles, Ill., assignor of one-half to Celest R. Spriet, St. Charles, Ill.

Application December 4, 1940, Serial No. 368,509

18 Claims. (Cl. 180—14.5)

The present invention relates to an improved draft apparatus for use with a draft vehicle and an appliance which is moved by the draft vehicle, the most common instance of which is the tractor-plow combination used in the tilling of soil, and similar combinations of tractor and other implements customarily used on motorized farms.

In combinations of this type, there has always existed the problem of preventing damage to the plow or other implement during the time when the implement strikes an immovable obstruction such as a stump, snag or boulder. The most usual type of apparatus for preventing such damage has been the use of a relatively soft sheer pin at some point of connection between the tractor and the implement, the idea being that when the implement strikes an obstruction, the pin will be shorn off and the implement thereby spared the excessive stresses which would otherwise occur.

Other draft limiting appliances have also been contrived with the idea of limiting the forces imposed upon the implement, but such devices have been cumbersome, not readily adaptable to existing machines, and frequently incapable of performing their intended functions.

It is an object of the present invention to provide an improved draft and draft vehicle controlling appliance which is capable, not only of limiting the draft load capable of being transmitted by the appliance, but also capable of causing the stopping of the draft vehicle upon encountering an obstruction.

It is also an object of the invention to provide a draft appliance, which is capable of being re-established into the normal operating condition merely by backing the vehicle. This is of especial advantage where an enclosed cab or high seat is used on the tractor, for the driver of the traction vehicle is thereby spared the necessity of dismounting from the vehicle for re-establishing the draft connections. In this regard, it may be stated that in the use of many prior devices, the re-establishing of the draft connection has been very difficult of accomplishment by a single operator since it has usually been necessary to back the vehicle to the implement and simultaneously raise or position the draft linkage for coupling. Where a single operator has sought to accomplish this, much time is consumed in backing and positioning the traction vehicle.

In the use of a tractor-implement combination, it frequently occurs that the tractor encounters soft ground and is incapable of moving the implement. This has occasioned much loss in time in backing the tractor and the implement to a position such that traction may be regained. In the present invention, a draft linkage is provided which is capable of operating to transmit draft power in two different lengths of extension. When normally used, the draft appliance is not extended, but should a condition of insufficient traction be encountered, means is provided for extending the draft linkage for an additional distance sufficient to permit the tractor to move ahead to firmer ground, and this is normally sufficient to overcome the condition of bad traction. As soon as the implement is moved past the troublesome spot, the traction appliance is closed to its normal operating condition whereupon the normal operation ensues.

It is, therefore, an object of the invention to provide an improved draft linkage capable of such usage.

It is likewise an object of the invention to provide an especially rugged draft appliance capable of carrying its maximum permissible load without any substantial increase in length, but yet capable of very rapid action to permit extension of the draft linkage in the event an obstruction is reached, which causes the draft power to increase beyond the permissible maximum.

More specifically, it is an object of the invention to provide an improved draft linkage in which a detent is provided between the linkage parts and more particularly to provide a toggle type detent for such purpose.

These and other objects of the invention are those inherent in and implied by the invention herein illustrated, described and claimed.

This invention is illustrated with reference to the drawings in which

Figure 1 is a side elevational view of the tractor-implement combination showing a fragment of the tractor, and the improved draft and draft vehicle controlling device in place between the tractor and the implement;

Figure 2 is a sectional view in elevation showing the internal structural parts of the draft appliance. In this view the device is in the load carrying condition but is not loaded sufficiently to release. (See Figure 4.)

Figure 3 is a plan view partly in section taken along the lines 3—3 of Figure 2;

Figure 4 is a side elevational view partly in section showing the draft appliance just as it begins to release, this being the condition of the parts when the device is stressed to its maximum permissible loading, and the device is beginning to release.

Figure 5 is a side elevational view partly broken away showing the appliance in its partially extended condition, and with the vehicle control thereby moved to vehicle stopping condition by action of the appliance;

Figure 6 is a side elevational view partly in section showing the draft appliance fully extended. This view also shows the parts of the appliance in a condition such that the vehicle control is moved to vehicle stopping condition, this functional condition being maintained during movement of the parts from the position shown in Figure 5 to that shown in Figure 6;

Figure 7 is a side elevational view taken from the opposite side of the draft appliance and showing the parts operated by a manual control, thereby permitting the appliance to move to the extended position without at the same time operating the vehicle controls to vehicle stopping condition.

Throughout the drawings, corresponding numerals designate corresponding parts.

Referring to Figure 1, 10 generally designates a side view of the rear part of the traction vehicle having a frame 1, an engine 2, rear drive wheels 3, steering wheel 4, driver's station 5, and a vehicle stopping foot pedal or lever 6, which is moved forwardly at its upper end to halt the vehicle. The tractor illustrated may be of any conventional type for either pushing or pulling an implement, generally designated 20. In Figure 1, the implement is represented by a gang type plow having carrying wheels 21, frame 22, plows 23 and an elevating axle 24.

The traction vehicle 10 and the implement 20 per se do not form a part of the invention, and it is to be understood that any customary type of traction vehicle may be used and that likewise any implement such as plow, disc, harrow, combine, mower, grader, bulldozer or the like may be used, as desired, either behind or ahead of the traction vehicle, the only limitation being that the traction vehicle should be of the type having a vehicle stopping control lever 6, which may be either a foot pedal, clutch lever, of the spring controlled or over-center type or any other transmission control lever for disengaging the driving wheels of the traction vehicle from the engine thereof. Similarly, in lieu of the transmission or clutch control lever 6, the vehicle may have any other vehicle disabling lever or part movable to the vehicle stopping condition. The draft appliance may be used either for pushing or pulling the load, by appropriate reversal of the parts.

Between the traction vehicle 10 and the implement 20, there is located the draft appliance, generally designated 30, of the present invention, which is attached to the rear traction frame 8 of the tractor by means of a bolt 9 and similarly attached to the implement frame 22 by means of the bolt 25.

Referring now to Figures 2 and 3, the draft and vehicle controlling appliance comprises a pair of relatively movable members 31 and 32, the first member 31 being attached to the draft frame 8 of the tractor and the member 32 being attached to the implement frame 22 by bolts or pins as aforementioned. The relatively movable members 31 and 32 of the draft appliance are preferably made in the form of telescoping tubes, but it is to be understood that channel members, bars, rods and other shapes may be used, if desired.

In the illustrated embodiment of the invention, the member 31 is a tube and is provided with a cast iron or steel cap 33, which is threaded to the tube at 34 and prevented from turning, and additionally clamped by means of a through bolt 35 at the lower side of the cap. The cap 33 is preferably split at the bottom so that as the bolt 35 is tightened, the cap is clamped upon the threads 34 of the tube 31. In addition, it is, in some instances, desirable to position bolt 35 so as to intersect a keyway in the tube 31 and when this is done the threads 34 may be eliminated since the bolt will serve as a stress transferring member between the cap 33 and the tube 31.

The outer tubular member 32 is preferably rolled from sheet stock so as to leave an open slot 36 at the bottom thereof, the member 32 being fitted into the cast metal rear end box 39. At the end of the box 39, there are provided the spaced tongues 40, which form the hitch by means of which the draft appliance is attached to the implement 22.

About midway between the ends of the tubular member 32, there is provided a cross bracket 42 which has holes 43 for receiving brace rods or chains running to the implement, to the traction vehicle or both, as desired. The cross bracket 42, in addition, serves as a stiffening member for the slotted bottom of the tube 32. It is noted that brace 42 is bent in a downward curve adjacent the slot so as not to interfere with parts sliding along the slot.

At the forward end of the tube 32, the slot 36 in the bottom of the tube is bridged by a plate 47, which is welded to tube 32. The plate has an opening therein which serves as a detent stop, as hereinafter described.

The inner tube 31 extends throughout the length of the tube 32 and into the box 39, and is cut down at 49 so as to leave a rear lower portion 50 extending toward the rear wall 52 of the box 39. This is exposed within the box as a half cylindrical shell. Adjacent the portion 49, there is a web 55 welded into the tube 31, this web being a seat for heavy spring 56. The spring 56 extends forwardly within tube 31. The web 55 is apertured to receive a rod 57 on the end of which there is welded a plate 58 which engages the forward end 59 of the spring 56, and the rod extends rearwardly through the aperture of web 55 and is threaded into a member 60. The member 60 is preferably of cast iron or cast steel and is shaped generally to conform to the inner cylindrical surface of the lower rear part 50 of the tube 31.

The lower rear part 50 of the tube 31 is slotted as shown at 51 so as to permit a lug 61 on the member 60 to extend downwardly therethrough. The length of slot 51 is sufficient that lug 60 is free to move therein without interference, the limits of movement being imposed by web 55 and spring 56. Since the slot 36 is in the lower part of the tube 32 and extends throughout most of its length, the lug 60 is free to move as tube 31 moves. Lug 61, of course, clears midbrace 42. As will be explained hereinafter, the lug 61 does not come into play until the draft appliance is extended to its outermost limit, the lug 61 serving to prevent movement beyond the position shown in Figure 6 in which position the lug 61 abuts against the rear portion 48 of the plate 47.

Rearwardly of the lug 61, and constituting a part of the member 60, there is integrally formed a cross rod 64, which serves as one part of the linkage transmitting the draft forces of the appliance.

Referring now to Figures 2, 3, 4, 5 and 6, it will be observed that the box 39 includes a toggle composed of a link, generally designated 70, which is pivoted to the box 39 upon cross shaft 71, and a free end link, generally designated 80, which is pivoted to the link 70 by means of the pivot pin 81. The cross shaft 71, journalled in the bosses 72 within the box 39, extends at one side of the box as shown in Figure 3 where it receives an operating lever 73 as illustrated in Figure 7. Within the box 39, the free end of link 80 is formed with a semi-circular notch 82, which, in the position shown in Figure 2, engages with the cross rod 64 on member 60. As shown in Figure 3, the member 70 has parallel side frame parts 70a between which the cylindrical portion 80a of the toggle link 80 is positioned, and the free end of the toggle link 80 extending rearwardly and below the rear cross bar 70b of the member 70. By this construction, the toggle links 70 and 80 are made exceptionally strong, and they easily serve to transmit the draft forces of the appliance.

The toggle 70 likewise carries an intermediate shaft 74 upon which roller 75 is positioned. Beneath the roller 75, there is a cam plate 65, which is carried by a cross bar 66 on the portion 50 of tube 31. When the toggle links 70 and 80 are in the position shown in Figure 2, they are slightly over-center with the center line of pivot shaft 81 being slightly below the line between the center 71 and cross rod 64. In this position, the cam plate 65 is slightly to the rear of the roller 75, the spacing being 3/32 to 1/16 of an inch. An accurate adjustment of the cam plate 65 with respect to the roller 75 is permitted by virtue of the fact that the rod 57 is threaded into the forward wall 62 of the member 60, there being several spacing shims 63 between the web 55 and the member 62 as initial adjustment requires. It is noted that the rod 57 is slotted at its rear end to receive a screw driver which may be inserted through the rear hole 41 in the box 39, this being possible when the toggle links 70 and 80 are sufficiently elevated by hand.

The rod 57 is accordingly turned up so as definitely to fix the position of the member 60 with respect to the web 55, and since the latter is immovably attached to the tube 31, it follows that the member 60 may be adjusted backwardly and forwardly with reference to the member 31 and everything mounted thereon. Since the cam plate 65 is carried by the cross bar 66 mounted on the rear portion 50 of tube 31, it follows that by rotating the rod 57, or by taking out or adding shims at 63, the adjustment between the cam plate 65 and roller 75 may be varied at will. In this connection, it is noted that the rear cross frame member 70b of the toggle link 70 determines the lowermost position of the toggle link 70 with respect to the toggle link 80 and this accordingly positions roller 75.

Figures 2, 4, 5 and 6 are a sequential series of positions during extension. Figure 2 shows the normal, closed or unstressed positions; Figure 4 shows the maximum stress condition as the toggle "breaks" and extension begins; Figure 5 shows the partially extended position, in which the clutch control (tractor stopping control) is completely operated, and Figure 6 shows the completely extended position with the clutch control maintained operated. The functioning of the parts throughout these positions is explained in greater detail in the following paragraphs:

*Figure 2.—Normal condition.*—As the traction vehicle 10 is moved forwardly, the force is transmitted through tube 31 to the web 55, and through spring 56 to plate 58 and rod 57, thence as a tension in rod 57, to the casting 60 and the force is thence transmitted backwardly through the casting 60 to the cross rod 64 and thence through the straightening toggle links 80 and 70 to the cross rod 71 and the box 39, and through the latter to the spaced tongues 40 by which the draft appliance is attached to the implement frame 22. Normally, this force does not compress spring 56 to the position of Figure 4 and the device therefore does not extend.

*Figure 4.—Extending begins.*—As the draft force increases, the spring 56 is compressed thereby drawing the web 55 away from the spacing shims 63 to the position shown in Figure 4. When this occurs, the cam plate 65 which moves with tube 31, advances under the roller 75 and lifts it, thereby raising the axis of toggle pivot pin 81 above a line between the center of shaft 71 and the cross bar 64 and the toggle is accordingly "broken" so that it is free to move to the position shown in Figure 5, thus permitting the cross bar 64, the member 60 and all of the parts attached to tube 31 (including the tractor) to move forwardly. Thus when the implement encounters a snag or a boulder and the draft force reaches the predetermined maximum, the toggle links 70 and 80 are moved to the angular or "breaking" position and the hitch extends. The implement 20 is then no longer moved, the tractor 10 being permitted to move forwardly freely.

It is to be noted that, due to the fact that roller 75 is about half way between the shaft 71 and the toggle pivot 81, the movement of the toggle pivot 81 is approximately twice as much as the corresponding movement of roller 75 thus making the action of the detent very sensitive. However, this is not to imply that the toggle 70—80 will be moved due to each little obstruction since for practically the whole range of loadings of spring 56, up to the maximum loading illustrated in Figure 4, the cam plate 65 is not in contact with roller 75. As soon as contact is established (at a load of near maximum), very little additional compression of spring 56 is needed to move the toggle pivot over center.

The detent serves to transmit its maximum force in its straightened condition shown in Figure 2, and while in this condition, the stressed distribution on the various parts is such that none of the parts are excessively stressed. Then due to very slight movement upwardly of the toggle links 70 (including pivot pin 81), the toggle is moved to a condition in which it is incapable of transmitting any force whatever. There is no condition of the parts in which there is an excessive stressed concentration.

It is also to be noted that when the parts have moved to the position shown in Figure 5 that the spring 56 has again brought the member 60 forwardly and hence the adjustment shims 63 are held tightly between the wall 62 and the web 55.

*Figure 5.—Partially extended clutch or tractor control completely operated.*—At the forward end of tube 31 and within the tube there is a slider, generally designated 90, which is mounted for free endwise movement within the interior of the tube 31. The slider is preferably a casting of generally cylindrical outer surface and has a lower skid 91 and side wall portions 92. Across the front portion, there is a connecting web 93 which is apertured to receive a thimble 94, which slides through the web 93. The thimble 94 has attached thereto a flexible metal cable 95. The cable runs forwardly and is attached by clevis 96 to a downward extension of a clutch or other control lever 6. It may be noted that in the illustrated embodiment, the clutch or control lever 6, when moved forwardly at its upper end, in the customary manner of automotive and tractor clutches, serves to disengage the driving connection between the motor 2 and drive wheels 3 of the tractor, and accordingly, as the lower extension is drawn backwardly by means of the cable 95, the same effect occurs. If desired, the cable may be taken over a forward pulley and then to the upper portion of the clutch lever.

The slider 90 is likewise provided with a rear cross shaft 97 upon which there is mounted a downwardly and forwardly extending detent 99, the detent 99 being provided with a downwardly turned tip 100, which is beveled and abuts against a similarly shaped surface 101 of the plate 47. When the detent 100 is in the position shown in Figures 2 and 4, the detent 100 prevents the slider 90 from movement with reference to the outer cylinder 32, and therefore, during the initial extending movement of the tube 31, the beginning of which movement is shown in Figure 4, the detent 100 holds the slider immovably. Accordingly, the cable 95, which is attached between thimble 94 on the slider 90 and the clutch lever 6, becomes stressed due to the forward movement of the tractor. Outside of the thimble 94, there is a spring 98, which merely serves to retract the parts to the condition shown in Figure 2, but this spring is much weaker than the springs used in the clutch in the traction vehicle, and is therefore immediately completely compressed. As the vehicle moves forwardly, the spring 98 is compressed.

The rear end of the thimble 94 is provided with a tailpiece 103, which is pivotally connected to a bell-crank detent 104, the latter being pivoted upon the cross shaft 105 on the slider 90. As the device extends beyond the position shown in Figure 4, cable 95 becomes taut and further forward movement of the tractor causes the thimble 94 to draw the bell crank detent 104 against the underside of a cam plate 107 mounted on the interior of the tube 31. This condition continues until the tube 31 (and cam plate 107) finally reach a position as shown in Figure 5, in which position the forward edge 108 of the detent 104 snaps into position behind the rear edge 109 of the cam plate 107. When this occurs, the movement of the bell crank detent 104 is transmitted through the eye bolt 110 to the detent 99, thereby raising the same to the position shown in Figure 5. Should the force of the bell crank lever 104 be insufficient to move the detent 99 upwardly, as shown in Figure 5, this will nevertheless be accomplished by the leading edge 111 of the slot 112, through which the tip 100 of the detent 99 operates. When detent 100 is moved to the nondetaining condition shown in Figure 5, the slider 90, freed from its connection with tube 32, thereafter moves with tube 31. However, during the movement of the slider 90 relative to the tube 31 from the position shown in Figure 2 through the position shown in Figure 4 to the position shown in Figure 5, the slider 90 remains immovable with reference to tube 30. After the cable has been given five or six inches of relative rearward movement with reference to the tractor 10 (and cam 107 has moved to bring the face 109 in front of face 108), the clutch or other controlling or disabling lever 6 is by that time moved to the vehicle stopping position, and slider 90 is locked to the cam face 109, the tension of the clutch spring all the while tending to move the slider forwardly. Catch 104 against cam face 107, however, prevents such movement.

*Figure 6.—Completely extended condition.—* Although the vehicle is thus prepared to stop, it may nevertheless coast forwardly, and this is particularly true in modern rubber tired tractors. It should be remembered that in all positions of the extending movement beyond that shown in Figure 5, the restrained draft force of the implement has already been eliminated. Therefore, the tractor may coast ahead for a short distance varying from a few inches to a foot or more as may occur on a downhill pull. However, the forward coasting is in any event stopped when the lug 61 abuts against the rear portion 48 of the bottom plate on tube 32, all as shown in Figure 6, but even in this event, the stopping is cushioned by spring 56.

*Figure 7.—Operator controlled extension.—* In Figure 6, it will be noted that the slider 90 is shown in the condition in which it has already moved the lever 6 of the tractor control to the vehicle stopping position. In some instances, however, as where the tractor is unable to move due to insufficient traction, it is desirable to extend the draft appliance to the position shown in Figure 6 without, however, moving the clutch to stop the vehicle. The tractor is already stopped when in this position, but pushing control lever to 132, Figure 7, will give this action. In order to accomplish this function, the various parts of the apparatus are moved as shown in Figure 7 by means of a manual control lever 120. Lever 120 is pivoted at 121 to the lower part of the tube 32, and has a yoke 122, as shown in Figure 3, terminating in a tip 124, which bears against and raises the tip 100 of the detent 99. On the opposite end of the shaft 121, there is attached a control lever carrying a pull rod 125. The rod 125 extends rearwardly through an aperture in toggle operating lever 73 on shaft 71, and passes through an aperture in bracket 128 mounted upon the outer side surface of tube 32, as shown in Figures 3 and 7.

A spring 129 is interposed between the clevis 130 on rod 125, and the bracket 128, so as normally to move the control lever 120 in the direction of arrow 131 (i. e. toward the tractor) in which condition it is inoperative either to raise the tip 100 of detent 99 or to operate the toggle controlling lever 73. However, when the operator desires, he may move the operating lever 120 rearwardly as shown by arrow 132. When this occurs, the tip 124 of the yoke 122 bears against and lifts the tip of detent 99 thereby permitting the slider 90 to move with the tube 31. At the same time, the backward movement of rod 125 causes the toggle control lever 73 to be moved in the direction of arrow 133 thereby elevating the toggle links 70 and 80 to the position shown in Figure 7, and the toggle is thereby incapable of transmitting force in compression. The tractor may then easily be driven forward, due to the fact that there is no draft load upon it, and the draft appliance is extended to the position shown in Figure 6, except for the fact that the slider 90 is in a position with respect to tube 31 corresponding to that of Figures 2 and 3—that is to say, it has not been moved to the vehicle stopping position, and has thus not caused cable 95 to move the clutch 6 to stop the tractor.

When completely extended, the lug 61 abuts against the plate 48 and the tractor draft power is accordingly again transmitted through tube 31 to web 55 through spring 56 to plate 58 and thence through rod 57 to member 60, thence through lug 61 to the rear surface of plate 48, to the tube 32, and thence through spaced tongues 40 to the implement frame 22. The amount of forward movement permitted by the outside telescope, or extending movement of tube 31 with respect to tube 32 is usually sufficient to permit the tractor wheels to reach firmer ground thereby affording opportunity for moving the implement.

*Reset to normal condition.*—Whenever the draft appliance has been moved to the extended position shown in Figure 6, either by encountering an obstruction or under the control of the operator, the tubes 31 and 32 may be re-telescoped to the condition shown in Figures 2 and 3 merely by backing the tractor toward the implement. When this occurs, the cross rod 64 moves backwardly and lifts the link 80 of the toggle through the breaking position and finally to the over-center force transmitting position shown in Figure 2. The toggle links are always biased to the straight position by spring 135 which bears against lever 73.

When the clutch or other control lever has been moved to vehicle stopping condition as occurs when the parts are shown in Figure 6, the clutch or other lever must be reengaged to vehicle starting condition before the tractor may be backed toward the implement. This may be accomplished by the operator merely placing his foot upon the clutch lever thereby slackening the cable 95. When this occurs, spring 98 forces the thimble 94, and its tail piece 103 backwardly thereby moving the bell crank detent 104 away from the rear edge 109 of the cam plate 107. In this connection, it is noted that for smooth operation, it is desirable that the bevel on the rear edge 109 of the cam plate, and the corresponding bevel on the forward edge 108 of the bell crank lever 104 should be made at an angle A, which is slightly more than 90° with respect to a line running through the center of pivot 105. When constructed in this way, as the force of the clutch spring upon the cable 95 is eliminated, the comparatively smaller force of the spring 98 is easily capable of moving the detent 104 to the position shown in Figure 2. At the same time, the eye bolt 110 is likewise moved rearwardly of the apparatus and the spring 113 applies a force upon the detent 99 thereby tending to force it to the detaining condition shown in Figure 2, even though this condition is not reached until slider 90, as a whole, has been restored to the position shown in Figures 2 and 3. This occurs as the clutch spring drags the cable 95 and slider 90 forwardly.

Many obvious variations will be apparent to those skilled in the art and such are intended to be within the purview of the invention illustrated, described and claimed.

I claim as my invention:

1. An improved device for use with an automotive draft vehicle having a controller movable to vehicle stopping condition and an appliance moved by the draft vehicle, comprising first and second members relatively movable endwise, the first member being connected to the vehicle and the second to the appliance, so as to form a draft linkage therebetween, detent means to restrain relative endwise movement of said first and second members, and means operable when the members transmit a predetermined maximum draft load for moving said detent to a non-restraining position whereby the members are permitted to move endwise with respect to each other, means mounted for movement with respect to both members and connectible to the controller of the vehicle for controlling stopping thereof, and means for holding said means fixedly with respect to the second member during a first part of the endwise movement of the members whereby there is a relative movement of said means with respect to the first member and the draft vehicle so as to move the vehicle controller to vehicle stopping condition and for then holding the means with respect to the first member with the controller so operated as the members are extending during coasting of the vehicle to a stop.

2. An improved device for use with an automotive draft vehicle having a controller movable to vehicle stopping condition which controller is normally spring biased to vehicle operation condition, and an appliance moved by the draft vehicle, comprising first and second members relatively movable endwise, the first member being connected to the vehicle and the second to the appliance, so as to form a draft linkage therebetween, detent means to restrain relative endwise movement of said first and second members, and means operable when the members transmit a predetermined maximum draft load for moving said detent to a non-restraining position whereby the members are permitted to move endwise with respect to each other, means mounted for movement with respect to both members and connectible to the spring biased controller of the vehicle for controlling stopping thereof, and means for holding said means fixedly with respect to the second member during a first part of the endwise movement of the members whereby there is a relative movement of said means with respect to the first member and the draft vehicle, so as to move the vehicle controller to vehicle stopping condition and for then holding the means from movement with respect to the first member with the controller so operated only while under the influence of the spring bias of the controller as the members are extended during coasting of the vehicle to a stop.

3. A device of the type set forth in claim 1 wherein the detent for restraining endwise movement of the members is a toggle composed of links pivoted together, said toggle when straight being connected to transmit forces in compression from one of the members to the other of the members, and wherein the means operable when the members transmit a predetermined load to move the detent to non-restraining position includes a load transmitting spring interposed between the members and means movable with the spring for biasing the toggle links from their straightened position, whereby the toggle is incapable of transmitting forces in compression.

4. A device of the type set forth in claim 1 wherein the detent for restraining endwise movement of the members is a toggle composed of links pivoted together, said toggle when straight being connected to transmit forces in compression from one of the members to the other of the members, and wherein the means operable when the members transmit a predetermined load to move the detent to non-restraining position includes a load transmitting spring interposed between the members and means movable with the spring pressing against one of the toggle links at a point removed from the connection between the links for moving the toggle links from their straightened position, whereby the toggle is incapable of transmitting forces in compression.

5. A device of the type set forth in claim 1 wherein the members are cylinders which telescope.

6. A device of the type set forth in claim 1 wherein the first member is cylindrical and telescopes into the second member and the means mounted for movement with respect to both members is a slider within the inner cylinder, said slider having a detent thereon for engagement with the outer cylindrical member and another detent engageable with the inner cylindrical member.

7. A device of the type set forth in claim 1 wherein the means mounted for movement with respect to both members is a slider movable endwise with respect to the members, said slider carrying a detent normally engaged with the second member so as to hold the slider in fixed position relative thereto, the slider also being provided with a second detent engageable with the first member, said second detent being connected to the controller of the traction vehicle so as to be moved into detaining condition with the first member as the traction vehicle moves with respect to the second member.

8. A device of the type set forth in claim 1 wherein the means mounted for movement with respect to both members is a slider movable endwise with respect to the members; said slider carrying a detent normally engaged with the second member so as to hold the slider in fixed position relative thereto; the slider also being provided with a second detent engageable with the first member, said first and second detents being connected to the controller of the traction vehicle and the first detent being positioned to be engaged by the first member whereby the second detent is moved into detaining condition with the first member and the first detent is released from the second member as the traction vehicle moves with respect to the second member.

9. A device of the type set forth in claim 1 wherein the means mounted for movement with respect to both members is a slider movable endwise with respect to the members, said slider carrying a detent normally engaged with the second member so as to hold the slider in fixed position relative thereto, the slider also being provided with a second detent engageable with the first member, said second detent being connected to the controller of the traction vehicle so as to be moved toward detaining condition when the first member and the traction vehicle move with respect to the second member, said first detent being inter-connected to the second detent so as to be movable to non-detaining condition when the second detent has moved into detaining condition.

10. A device of the type set forth in claim 1 wherein the means mounted for movement with respect to both members is a slider movable endwise with respect to the members, said slider carrying a detent normally engaged with the second member so as to hold the slider in fixed position relative thereto, the slider also being provided with a second detent engageable with the first member, said second detent being connected to the controller of the traction vehicle so as to be moved toward detaining condition when the first member and the traction vehicle move with respect to the second member, said first detent being positioned so as to be movable to the non-detaining condition by engagement with a part of the first member when a fractional part of its endwise movement with respect to the second member is completed.

11. A device of the type described in claim 1, including manual means for simultaneously releasing the detent means and the means for holding, whereby the members may be extended endwise without thereby causing movement of the controller to vehicle stopping condition.

12. A device of the type described in claim 1 including manual means for simultaneously releasing the detent means and the means for holding, whereby the members may be extended endwise without thereby causing movement of the controller to vehicle stopping condition, and a positive stop for limiting the endwise movement of the members.

13. In the combination including an automotive draft vehicle and an appliance moved by the vehicle, an improved draft linkage comprising a member attached to the draft vehicle and another member slidable endwise with reference to the first member and attached to the appliance, detent means on one of said members for restraining relative sliding movement of the members, said detent comprising toggle links, pivoted together and capable of moving from a straightened condition in which said links act as a detent to restrain said sliding movement to a bent condition in which said sliding movement is permitted, and means responsive to a variation of draft force for bending the toggle links when the draft force reaches a predetermined maximum, including a draft spring for carrying the draft load, and a part movable therewith under load, said part being movable with the spring throughout a path which is free of engagement with said toggle links during a portion of the load carrying movement and into engagement with said toggle to move them to said bent non-load carrying condition as the spring is flexed when carrying said predetermined maximum load.

14. The combination set forth in claim 13 further characterized in that said part movable with the draft carrying spring engages one of said toggle links at a point between the pivotal connection of said links and the end of said link whereby relatively slight movement of said part upon the engaged toggle link causes relatively greater movement of the toggle link pivot to the bent non-load carrying position.

15. The combination set forth in claim 13 further characterized in that one of said toggle links is provided with a roller and the part movable with the draft carrying spring comprises a cam plate engageable with said roller for moving the toggle links to non-load carrying condition.

16. An improved device for use in connecting a propelled appliance and an automotive vehicle having a spring biased controller normally movable under influence of said spring to a position effecting propulsion of the vehicle but capable of being moved against the action of said spring to a position in which propulsion of the vehicle is not effected, comprising a draft linkage having a first part connected to the vehicle and a second part connected to the appliance, said linkage being extensible endwise when maximum permissible load is reached, a slider mounted on the linkage, a first detent means releasably connecting the slider to the second part of the linkage for movement therewith, means connecting the slider and spring biased controller of the vehicle whereby the controller is moved against the action of its biasing spring when the slider is moved with the second part of the linkage, a second detent on said slider operable after the slider has moved to a predetermined position with reference to the first part of the draft linkage for releasing the first detent whereby the slider is disconnected from the second part of the linkage, and for connecting the slider to the first part of the linkage, said second detent being movable to detaining condition by the force of said vehicle controller biasing spring and releasable when the vehicle controller is manually depressed whereby the slider is released from the first part of the draft linkage and is allowed to move under influence of the vehicle controller biasing spring as the vehicle controller moves to vehicle propelling position.

17. In the combination including an automotive draft vehicle having an operator station and an appliance adapted to be moved by the vehicle, an improved draft linkage comprising a member attached to the draft vehicle and another member attached to the appliance, said members being mounted for relative slidable movement endwise with respect to each other from a contracted position to an extended position, a fixed stop means on said members for limiting the relative sliding movement of said members at the extended position, manually controllable movable detent means for restraining movement of said members from said contracted position toward said extended position, and manually operable means conveniently located adjacent said operator station and connected to said manually controllable detent for moving said detent to a non-restraining position whereby the members may slide relative to each other in an extended direction from the contracted position until the movement is arrested by the fixed stop at the extended position.

18. In the combination including an automotive draft vehicle and an appliance moved by the vehicle, an improved draft linkage comprising a member attached to the draft vehicle and another member attached to the appliance, said members being mounted for relative slidable movement endwise with respect to each other from a contracted position to an extended position, stop means on said members for limiting the relative sliding movement of said members at the extended position, movable detent means having restraining and non-restraining positions for restraining movement of said members from said contracted position, load responsive means for moving said detent to non-restraining position thereby to permit relative sliding movement of the members when the draft load reaches a predetermined amount, including a heavy spring for transmitting the draft load, a member movable with said spring, said member being positioned so as to engage the detent at a predetermined load for moving said detent to non-restraining position, and separate manually operable means for also moving said detent to non-restraining position.

CARL A. GRASSWICK.